United States Patent
Lee et al.

(10) Patent No.: US 10,733,899 B2
(45) Date of Patent: Aug. 4, 2020

(54) APPARATUS AND METHOD FOR PROVIDING PERSONALIZED ADAPTIVE E-LEARNING

(71) Applicant: Electronics and Telecommunications Research Institute, Daejeon (KR)

(72) Inventors: Su Woong Lee, Sejong-si (KR); Ho Young Yoo, Daejeon (KR); Hyung Keun Jee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 333 days.

(21) Appl. No.: 15/413,780

(22) Filed: Jan. 24, 2017

(65) Prior Publication Data

US 2018/0151084 A1    May 31, 2018

(30) Foreign Application Priority Data

Nov. 30, 2016   (KR) .................. 10-2016-0161795

(51) Int. Cl.
G09B 7/02    (2006.01)
G09B 7/04    (2006.01)
G09B 5/14    (2006.01)

(52) U.S. Cl.
CPC .......... *G09B 7/04* (2013.01); *G09B 5/14* (2013.01)

(58) Field of Classification Search
None
See application file for complete search history.

(56) References Cited

U.S. PATENT DOCUMENTS

| | | | |
|---|---|---|---|
| 2006/0099561 A1* | 5/2006 | Griph | G09B 7/00 434/322 |
| 2008/0124696 A1* | 5/2008 | Houser | G09B 7/00 434/350 |
| 2013/0198791 A1 | 8/2013 | Yun et al. | |
| 2015/0243179 A1* | 8/2015 | Zaslavsky | G06Q 50/20 434/327 |
| 2015/0325138 A1* | 11/2015 | Selinger | G09B 7/00 434/322 |
| 2016/0005323 A1 | 1/2016 | Nkambou et al. | |
| 2016/0189554 A1 | 6/2016 | Kim et al. | |
| 2016/0217701 A1* | 7/2016 | Brown | G09B 7/00 |
| 2017/0278417 A1* | 9/2017 | Ur | G09B 7/06 |

FOREIGN PATENT DOCUMENTS

KR    10-2015-0116662    10/2015

OTHER PUBLICATIONS

Jimmy de la Torre, "DINA Model and Parameter Estimation: A Didactic"; Journal of Educational and Behavioral Statistics, Mar. 2009, vol. 34, No. 1, pp. 115-130.
Debora de Chiusole, "Modeling Missing Data in Knowledge Space Theory"; American Psychological Association, Psychological Methods, 2015, vol. 20, No. 4, pp. 506-522.

* cited by examiner

*Primary Examiner* — Omkar A Deodhar
(74) *Attorney, Agent, or Firm* — Kile Park Reed & Houtteman PLLC

(57) ABSTRACT

The present invention relates to an apparatus and method for providing personalized adaptive e-learning, and more specifically, to an apparatus and method for estimating a learner's proficiency to each attribute and providing adaptive e-learning by taking into consideration an item answering result of an individual learner in a personalized learning environment.

10 Claims, 4 Drawing Sheets

APPARATUS AND METHOD FOR PROVIDING PERSONALIZED ADAPTIVE E-LEARNING

CROSS-REFERENCE TO RELATED APPLICATION

This application claims priority to and the benefit of Korean Patent Application No. 10-2016-0161795, filed on Nov. 30, 2016, the disclosure of which is incorporated herein by reference in its entirety.

BACKGROUND

1. Field of the Invention

The present invention relates to an apparatus and method for providing personalized adaptive e-learning, and more specifically, to an apparatus and method for estimating a learner's proficiency to each attribute and providing adaptive e-learning by taking into consideration item answering result of a learner in a personalized learning environment.

2. Discussion of Related Art

Personalized adaptive e-learning is a technology that intelligently provides content and services in accordance with the learner's ability and characteristics, thereby enhancing the learning effect conveniently and efficiently.

The adaptive e-learning technologies that have been commercialized in the past have not focused on elaborating the diagnosis of learner characteristics, but have only relied on the correlation between the contents or merely counted the number of incorrect items to diagnose the weak attributes.

The adaptive e-learning technologies according to the related art have a problem in that the learner's diagnosis is not detailed, and thus it is difficult to properly identify and diagnose a case in which the learner mistakenly answers a item incorrectly even though the learner knows the attribute or a case in which the learner guesses and still gets a right answer even though the learner does not know the attribute.

In order to solve these problems, an archetypal cognitive diagnosis model has been suggested as a method of estimating learner's proficiency to each attribute on the basis of a given test result, but this method has a limitation in that a reliable result can be obtained only when a large number of learners have taken the exact same test at their best possible performance.

SUMMARY OF THE INVENTION

In order to address the above-described problems, the present invention proposes an apparatus and method for providing adaptive e-learning, which estimate learner's proficiency to each attribute by taking into consideration item answering result of an individual learner when calculating proficiency in a personalized learning environment where it is not ensured that all of a large number of learners take the same test with the exact same set of items.

In one general aspect, there is provided an apparatus for providing personalized adaptive e-learning including: an initializer configured to initialize item parameters and prior probability of possible attribute proficiency pattern; an input unit configured to receive a response matrix about item answering result of a learner; a conditional likelihood and probability calculator configured to calculate a likelihood for a combination of learner's possible attribute proficiency pattern with respect to the response matrix and calculate a posterior probability by taking into consideration the likelihood calculation result; and an updater configured to update the item parameters which maximizes the calculated likelihood according to a result of calculating the item parameters.

In another general aspect, there is provided a system for providing personalized adaptive e-learning including: a learner's terminal configured to provide a learner with content related to adaptive e-learning; a tutor's terminal configured to display tutoring data for the adaptive e-learning; and a server configured to diagnose a learner's level and derive a learner's level of understanding of each attribute by taking into consideration learning result information of the learner and item information.

In still another general aspect, there is provided a method of providing personalized adaptive e-learning learning including: initializing item parameters and prior probability of possible attribute proficiency pattern that a response to an item is correct when an attribute proficiency vector is given; calculating a likelihood for a combination of learner's possible attribute proficiency pattern by taking into consideration a response matrix which is given as a item answering result of a learner; calculating a posterior probability using the calculated likelihood and the prior probabilities; and updating the prior probabilities using a result of calculating the posterior probability and updating the item parameters.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
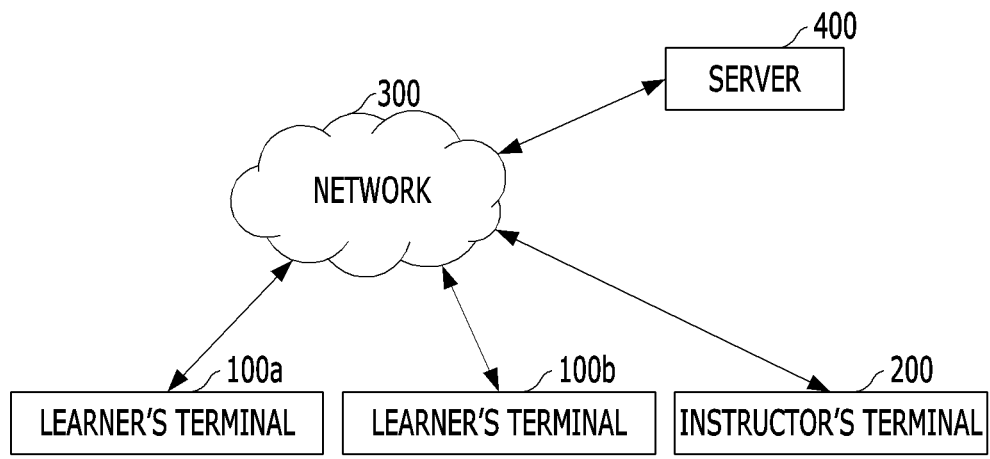
FIG. 1 is a diagram illustrating the overall structure of a system for providing adaptive e-learning according to one embodiment of the present invention.

Advantages and features of the present invention and methods of achieving the same will become apparent by referring to the embodiments described below in detail with reference to the accompanying drawings.

However, the present invention is not limited to the embodiments described below and various modifications may be made thereto. The embodiments are merely provided to thoroughly disclose the invention and to convey the aim of the invention to one of ordinary skill in the art. The present invention is defined by the appended claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Before describing embodiments of the present invention, adaptive e-learning technologies according to a related art will be described first in order to assist those skilled in the art to gain understanding of the embodiments.

The adaptive e-learning technologies according to the related art do not provide sophisticated diagnosis of learners, and hence in order to overcome such a problem, a cognitive diagnosis model, which is a more generalized model, has been proposed and a deterministic input, noisy "AND" gate (DINA) model is a representative cognitive diagnosis model.

The DINA model estimates the individual learner's proficiency to each attribute from group test information. When the number of learners is I, the number of items is J and the number of attributes is K, there are mainly two types of information to be input to the DINA model.

The first type of information is a Q-matrix, which is a binary matrix with the size of "J×K" indicating the correlation between the items used in the group test and the attributes, and the second type of information is an R-matrix, which is a binary matrix with the size of "I×J" indicating whether the learner's response to each item is correct.

From these two types of information, it is estimated whether each of the learners understands each attribute, and the result is output as an "I×K" binary matrix.

The Q-matrix, which is information about mapping between items and attributes, is defined in advance by education experts. The attributes necessary for answering the items are defined in detail and the detailed attribute is mapped to each item.

The $i^{th}$ learner's proficiency vector, i.e., $\alpha_i$, which represents learner i's proficiency to each attribute, is a binary vector, and a value of 1 for each element indicates that the attribute is understood and a value of 0 for each element indicates that the attribute is not understood.

The "AND" gate of the DINA model is an assumption that the learner has to know all the attributes that are mapped to a particular item in order to get the correct answer.

A latent response vector $\eta_{ij}$ as a factor for determining whether the $i^{th}$ learner has the skill to answer the $j^{th}$ item is modeled as the following Equation 1.

$$\eta_{ij} = \prod_{k=1}^{K} \alpha_{ik}^{q_{jk}}$$ [Equation 1]

$\eta_{ij}$ is expressed as 1 when learner i has the skill to answer item j, and it is expressed as 0 when learner i has no skill.

Here, $q_{jk}$ is an element of the Q-matrix and indicates whether knowledge of attributes k is required to correctly answer item j. When $q_{jk}$ is 1, it indicates that the attribute is required, and when $q_{jk}$ is 0, it indicates that the attribute is not required.

k represents the total number of attributes in the model. $\alpha_{ik}$ represents whether or not learner i understands attribute k, and the above-described $\alpha_i$ is a vector having $\alpha_{ik}$ as an element.

"noise" in the DINA model is a noise parameter which indicates the nature of the item, and refers to the assumption of including $s_j$ which is a probability that an answer is mistakenly incorrectly despite the latent response being 1, and $g_j$ which is a probability that a guessed answer is correct despite the latent response being 0. $s_j$ and $g_j$ are given by the following Equations 2 and 3, respectively.

$$s_j = P(X_{ij}=0|\eta_{ij}=1)$$ [Equation 2]

$$g_j = P(X_{ij}=1|\eta_{ij}=0)$$ [Equation 3]

The item parameters are item-specific parameters that vary in value according to the item and do not vary from learner to learner.

From the above assumption, the probability that the $i^{th}$ learner's response $X_{ij}$ to the $j^{th}$ item is correct when the attribute proficiency vector $\alpha_i$ is given is as defined in the following Equation 4.

$$P(X_{ij}=1|\alpha_i) = g_j^{1-\eta_{ij}}(1-s_j)^{\eta_{ij}}$$ [Equation 4]

$X_{ij}$ indicates whether learner i's response to item j is correct, 1 means a correct answer, and 0 means an incorrect answer.

By using a statistical calculation method, the individual learner's proficiency $\alpha_i$ of each attribute and the item parameters ($g_j$, $s_j$) may be estimated from the item answering result X of a learner.

A posterior probability $P(\alpha_i|X_{ij})$ is estimated using maximum likelihood estimation (MLE) of input X.

The DINA model according to the related art provides an effective method which can estimate the most likely learner's level of understanding of each attribute, which describes the given test result when attributes are appropriately constructed and the correlation between each item and the attributes is given in advance.

However, a problem of the method is that reliable results are obtained only when many learners take the exact same test at their best possible performance.

That is, the method can derive an effective analysis result when a result of a large-scale test, such as a scholastic aptitude test (SAT), is analyzed post-hoc or when a large number of learners take the same test en bloc in a group classroom, such as in an educational institution.

In other words, the DINA model has a limitation in that the entire data of an R-matrix has to be complete as shown in the following Table 1, and processing may not be performed when there is any missing data.

TABLE 1

|  | Item 1 | Item 2 | Item 3 | Item 4 | Item 5 |
| --- | --- | --- | --- | --- | --- |
| Learner 1 | O | O | O | O | O |
| Learner 2 | O | X | O | X | O |
| Learner 3 | O | O | X | X | X |
| Learner 4 | X | X | O | O | O |
| Learner 5 | X | O | O | O | X |

The horizontal axis represents items, the vertical axis represents learners, and "Item" denotes a item, "O" denotes a correct answer, and "X" denotes an incorrect answer.

That is, in the case of personalized learning, because it is not ensured that many learners take the exact same test, a item answering result of each learner is not applied to the calculation of the proficiency.

The present invention is proposed to address the problems described above, and suggests an apparatus and method for providing adaptive e-learning which allow the estimation of a learner's level of understanding of each attribute in a personalized learning scenario.

An R-matrix that assumes a personalized learning situation according to the present invention is as shown in the following Table 2.

TABLE 2

|  | Item 1 | Item 2 | Item 3 | Item 4 | Item 5 |
|---|---|---|---|---|---|
| Learner 1 | O | O | O | O | M |
| Learner 2 | O | X | O | X | M |
| Learner 3 | O | O | X | X | X |
| Learner 4 | X | M | O | O | M |
| Learner 5 | M | O | O | M | X |

The horizontal axis represents items, the vertical axis represents learners, and "Item" denotes a item, "O" denotes a correct answer, "X" denotes an incorrect answer, and "M" (missing response) denotes a missing result in answering a item.

In the personalized learning situation assumed by the present invention, a different set of items is provided to each individual, and thus the entire set of items answered varies from learner to learner.

When a missing response (M) is counted as incorrect, a false estimation result is obtained, and thus the present invention proposes a technique for accurately estimating an individual learner's level of understanding even when a large number of learners do not answer the exact same item.

FIG. 1 is a diagram illustrating the overall structure of a system for providing adaptive e-learning according to one embodiment of the present invention.

The overall system includes a learner's terminal 100 (including a stationary terminal, such as a personal computer (PC), and a mobile terminal such as a notebook computer, a mobile device, a tablet computer, or the like), an instructor's terminal 200, and a server 400. The server 400 may be configured with a single workstation or a group of a plurality of workstations.

Figure 2:
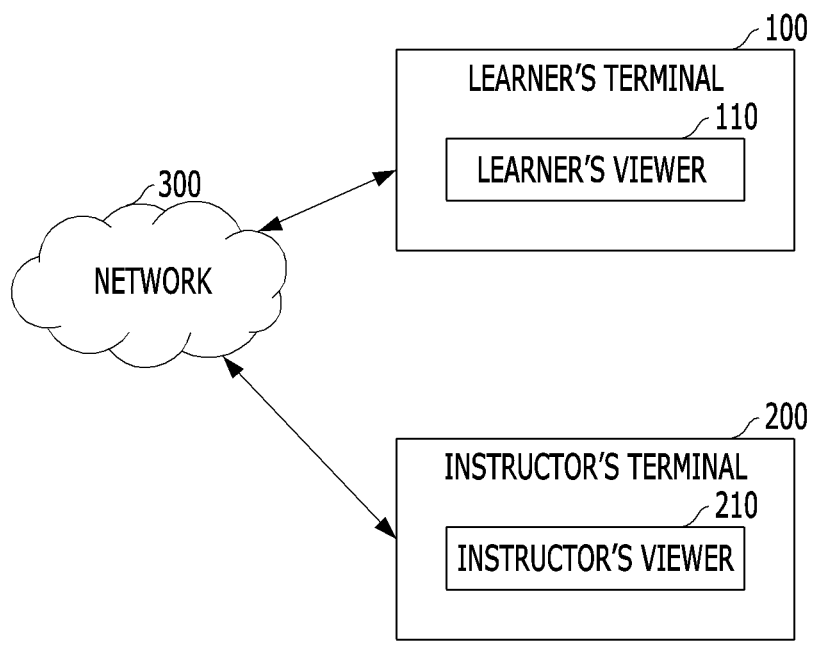
FIG. 2 is a diagram illustrating a learner's viewer and a tutor's viewer according to one embodiment of the present invention.

The internal structure of a client is divided into a learner's viewer 110 of the learner's terminal 110 and a tutor's viewer 210 of the instructor's terminal 200, as shown in FIG. 2. The learner's viewer 110 is a user interface of the personalized adaptive e-learning system that is directly correlated with a learner, and displays the same result regardless of a device.

The learner's viewer 110 displays basic descriptions, such as test progress, confirmation of understanding of each attribute, supplementary learning for a weak attribute, and the like.

The instructor's viewer 210 organizes and displays various types of information for instructors to easily grasp the learning situation of learners, receives various data necessary for tutoring, such as test history, grades, hourly statistics by class, and the like, from an adaptive e-learning database (DB), and displays the data on a screen.

Figure 3:
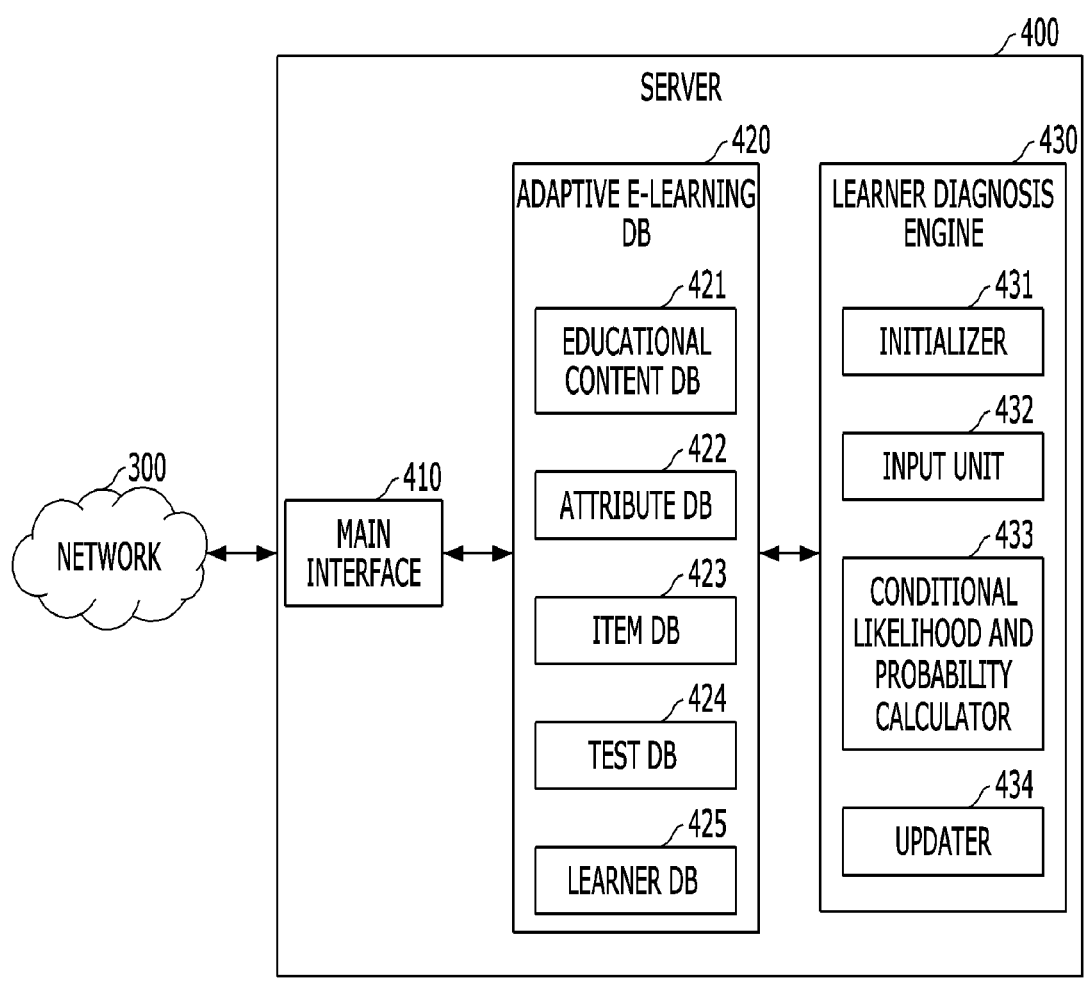
FIG. 3 is a diagram illustrating a configuration of a server of a personalized adaptive e-learning system according to one embodiment of the present invention.
Figure 4:
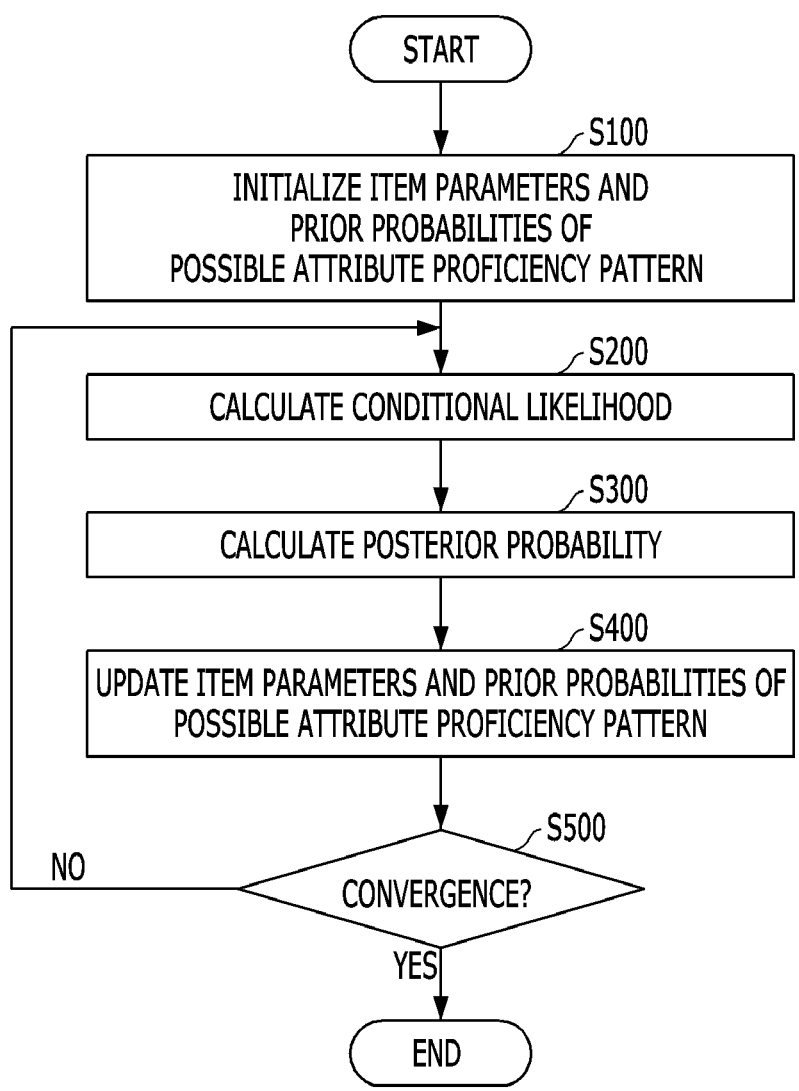
FIG. 4 is a flowchart illustrating a method of providing personalized adaptive e-learning according to one embodiment of the present invention.

FIG. 3 is a diagram illustrating a configuration of the server 400 according to one embodiment of the present invention, and FIG. 4 is a flowchart illustrating a method of providing personalized adaptive e-learning according to one embodiment of the present invention.

The server 400 according to one embodiment of the present invention includes an adaptive e-learning DB 420, a learner diagnosis engine 430, and a main interface 410.

Various types of data are stored in the adaptive e-learning data 420, the learner diagnosis engine 430 diagnoses the learner's level, the main interface 410 drives the adaptive e-learning DB 420 and the learner diagnosis engine 430, takes charge of connecting with the outside, and performs a management function for the learner and an administrator to smoothly use the system, for example, in statistical processing.

The main functions of the main interface 410 include checking of a learner's learning status, learner performance management, and content packaging.

The adaptive e-learning DB 420 of the server 400 manages data for providing adaptive e-learning, and provides data needed by the learner's viewer 110 described above, the instructor's viewer 210, the learner diagnosis engine 430, and the main interface 410.

The adaptive e-learning DB 420 includes an educational content DB 421, a item DB 423, and a attribute DB 422 which are correlated with each other, and further includes a learner DB 425 and a test DB 424 which are correlated with these DBs 421, 423, and 422.

Lecture videos for personalized adaptive e-learning are stored in the educational content DB 421, and items of various forms, such as multiple choice items, essay or short form items, matching items, and the like, are stored in the form of a item bank in the item DB 423, and information on which attributes are matched with individual items is also stored in the item DB 423.

The attribute DB 422 is configured to store attributes which are learning elements that are mutually distinguished, and specifically configured to store a complete list of the attributes, the learner's level of understanding of each attribute, information about matching between the attributes and the items, and conceptual diagrams for the attributes.

The above-described educational content DB 421, the item DB 423, and the attribute DB 422 are correlated in a mutual N-to-N relationship, which is essential information for providing adaptive e-learning.

The learner DB 425 is a DB for storing personal information of the learner and configured to store personal information, a learning history, and learning information, and the test DB 424 is a DB for managing tests in which the items are gathered and configured to store the test history, test items, and learner responses to the test.

The learner diagnosis engine 430 according to the embodiment of the present invention is correlated with the adaptive e-learning DB 420, receives learning result information (learner-item correlation) and item information (item-attribute correlation), and derives the learner's level of understanding of each attribute (learner-attribute relationship).

According to the embodiment of the present invention, a plurality of learners advance the learning process by answering personalized, i.e., their own items which are different from one learner to another.

The item answering results of the plurality of learners are stored in the DB of the server 400 though the learner's viewer 110, and when the learning result of one learner is collected in the adaptive e-learning DB 420 of the server 400, the learner diagnosis engine 430 performs optimal estimation of the learner's level of understanding and item parameters.

In this case, the learner's level of understanding and the item parameters may be constructed using various methods, such as a cognitive diagnosis model, item response theory, knowledge space theory (KST), and the like, and in the detailed description of the present invention, a configuration for estimating a learner's level of understanding, on the basis of a cognitive diagnosis model-based modeling method, under a situation where the individual learner's history of answering each item is personalized is proposed.

In the embodiment of the present invention, it is assumed that a set of items presented to each of the learners is different, as shown in the above Table 2, and the learner's level of understanding and the parameters are estimated without processing missing data as an incorrect answer.

That is, according to the embodiment of the present invention, a conditional likelihood is calculated except for the portion in which no data is present in $X_{ij}$ which indicates whether the response is a correct or incorrect answer, and in estimating the item parameter $s_j$ (a probability that an answer is mistakenly incorrect even when a latent response is 1) and the item parameter $g_j$ (a probability that a guessed answer is correct even when the latent response is 0), the item parameters are updated by extracting only the portion in which $X_{ij}$ is valid and calculating the portion separately.

According to the embodiment of the present invention, a probability that the $i^{th}$ learner's response $X_{ij}$ to the $j^{th}$ item is correct when a attribute proficiency vector $\alpha_l$ is given is defined by the following Equation 5.

$$P_j(\alpha_l) = g_j^{1-\eta_{ij}}(1-s_j)^{\eta_{ij}} \quad \text{[Equation 5]}$$

According to the embodiment of the present invention, an initializer 431 of the learner diagnosis engine 430 initializes each of the item parameters $s_j$ (a probability that an answers is mistakenly incorrect even when a latent response is 1) and $g_j$ (a probability that a guessed answer is correct even when the latent response is 0) (e.g., sets the parameters to the same preset value, 0.2) and also initializes prior knowledge on the level of understanding of each attribute (S100).

An input unit 432 of the learner diagnosis engine 430 receives a response matrix that is given as a item answering result of a learner, and a conditional likelihood and probability calculator 433 calculates a conditional likelihood for a combination of the learner's levels of understanding (S200). The conditional likelihood is given by the following Equation 6.

$$L(X_i|\alpha_l) = \Pi_{j \in J_i} P_j(\alpha_l)^{X_{ij}}(1-P_j(\alpha_l))^{1-X_{ij}} \quad \text{[Equation 6]}$$

In this case, the conditional likelihood is calculated except for the portion in which no response is present, that is, the portion in which no data is present in $X_{ij}$ which indicates the correct or incorrect answer.

The conditional likelihood and probability calculator 433 calculates a posterior probability $P(\alpha|X)$ using the value of $P(\alpha)$ which is initialized in the initializer 431 (S300).

An updater 434 of the learner diagnosis engine 430 updates $P(a)$ from the calculation result of the posterior probability, calculates values of the parameters $s_j$ and $g_j$ that maximize the likelihood by performing partial differentiation of each parameter, and, in turn, updates $s_j$ and $g_j$ (S400).

In this case, the above-described operations S200 to S400 are repeatedly performed until convergence, and the parameter estimation is performed according to the following Equations 7 and 8.

$$\widehat{g_j} = \frac{\sum_{l:\alpha'_l q_j < q'_j q_j} R_{jl}}{\sum_{l:\alpha'_l q_j < q'_j q_j} I_{jl}} \quad \text{[Equation 7]}$$

$$\widehat{s_j} = 1 - \frac{\sum_{l:\alpha'_l q_j = q'_j q_j} R_{jl}}{\sum_{l:\alpha'_l q_j = q'_j q_j} I_{jl}}$$

-continued $$I_{jl} = \sum_{i:\{X_{ij} \text{ is valid}\}} P(\alpha_l | X_i) \quad \text{[Equation 8]}$$

$$R_{jl} = \sum_{i:\{X_{ij} \text{ is valid}\}} P(\alpha_l | X_i) X_{ij}$$

Here, $I_{jl}$ represents an expected value of the number of learners with an understanding pattern of $\alpha_l$ among the learners who have answered the question, and $R_{jl}$ represents an expected value of the number of learners with the understanding pattern of al among the learners who have correctly answered the $j^{th}$ item.

The learner diagnosis engine 430 according to the embodiment of the present invention updates the item parameters by extracting only a portion in which $X_{ij}$ is valid and calculating the portion separately when calculating the parameters, so that the individual learner's level of understanding can be accurately estimated even when not all of the large number of learners answer the same item.

The apparatus and method for adaptive e-learning according to the present invention can accurately estimate individual learners' understanding of each attribute even when a large number of learners do not answer the exact same item, and hence it is possible to accurately diagnose a learner's learning status.

The effects of the present invention are not limited to the above effect, and other effects should be clearly understood from the above-described overall descriptions.

Figure 5:
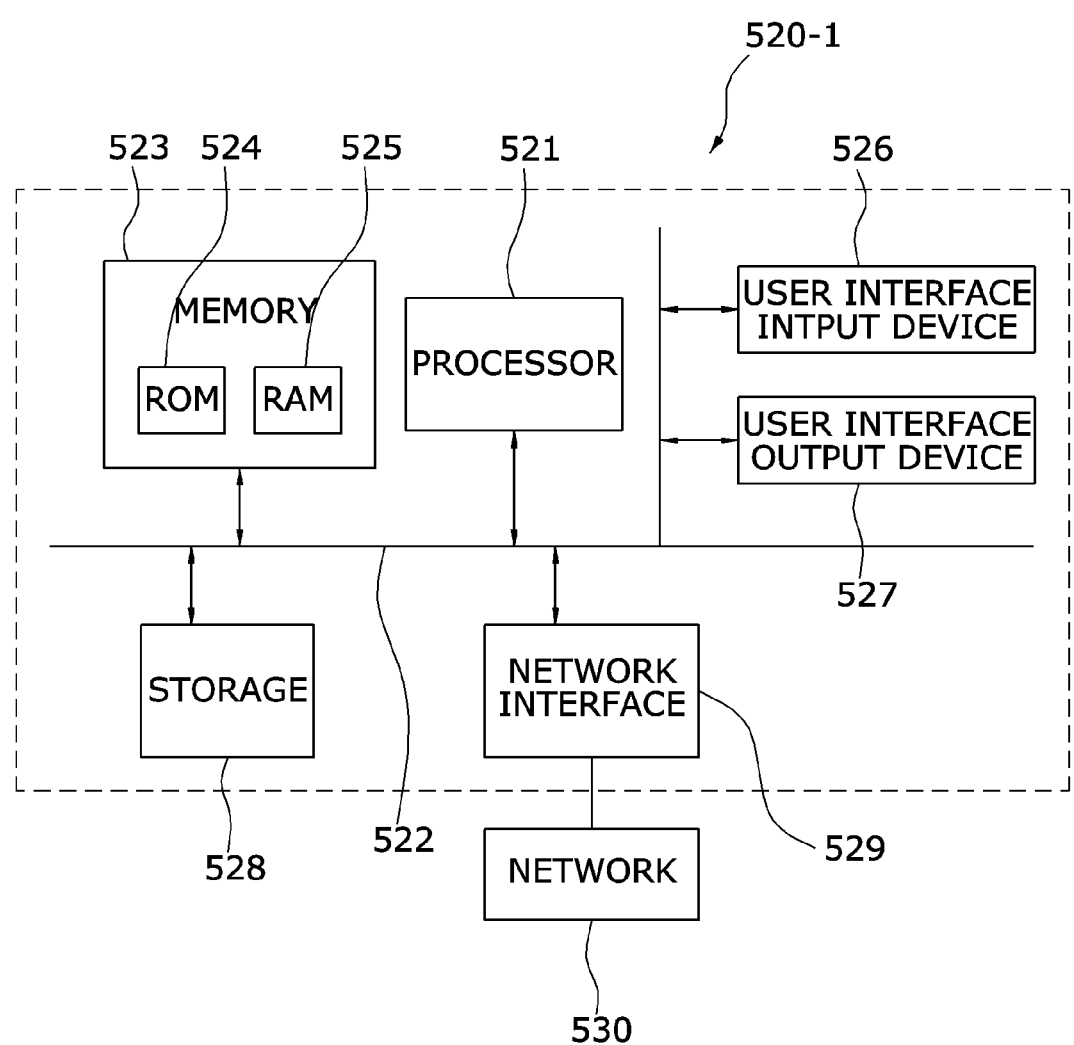
FIG. 5 is a view illustrating an example of a computer system in which a method for providing personalized adaptive e-learning s according to an embodiment of the present invention is performed.

The method for providing personalized adaptive e-learning according to an embodiment of the present invention may be implemented in a computer system or may be recorded in a recording medium. As illustrated in FIG. 5, a computer system may include at least one processor 521, a memory 523, a user interface input device 526, a data communication bus 522, a user interface output device 527, and a storage 528. The components perform data communication via the data communication bus 522.

The computer system may further include a network interface 529 coupled to a network. The processor 521 may be a central processing unit (CPU) or a semiconductor device processing a command stored in the memory 523 and/or the storage 528.

The memory 523 and the storage 528 may include various types of volatile or nonvolatile storage mediums. For example, the memory 523 may include a ROM 524 and a RAM 525.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

REFERENCE NUMERALS

| | |
|---|---|
| 100: LEARNER'S TERMINAL | 110: LEARNER'S VIEWER |
| 200: INSTRUCTOR'S TERMINAL | 210: INSTRUCTOR'S VIEWER |
| 300: NETWORK | 400: SERVER |
| 410: MAIN INTERFACE | 420: ADAPTIVE E- |

-continued

| REFERENCE NUMERALS | |
|---|---|
| 421: EDUCATIONAL CONTENT DB | LEARNING DB |
| 422: ATTRIBUTE DB | 423: ITEM DB |
| 424: TEST DB | 425: LEARNER DB |
| 430: LEARNER DIAGNOSIS ENGINE | |
| 431: INITIALIZER | 432: INPUT UNIT |
| 433: CONDITIONAL LIKELIHOOD AND PROBABILITY CALCULATOR | |
| 434: UPDATER | |

What is claimed is:

1. An apparatus for providing personalized adaptive e-learning comprising:
    a server including a processor and memory, the memory comprising instructions which upon being processed by the processor, executes:
    a main interface configured to manage a status of learning or grades;
    an adaptive e-learning database (DB) configured to store data for providing adaptive e-learning; and
    a learner diagnosis engine configured to estimate a learner's level of understanding, in order for accurately estimating the learner's level of understanding when a large number of learners do not answer a same item, comprising:
        an initializer configured to initialize item parameters and prior probabilities of possible attribute proficiency pattern;
        an input unit configured to receive a response matrix about item answering result of learners;
        a conditional likelihood and probability calculator configured to calculate a likelihood for combining the learner's prior probability of possible attribute proficiency pattern and a possible attribute proficiency pattern with respect to the response matrix, and calculate a posterior probability by taking into consideration the likelihood calculation result according to:

$L(X_i|\alpha_l) = \Pi_{j \in J_i} P_j(\alpha_l)^{X_{ij}} (1-P_j(\alpha_l))^{1-X_{ij}}$ wherein Xij indicates a correct or incorrect answer, wherein a conditional likelihood is calculated except for a portion in which no response is present in Xij; and
        an updater configured to update the item parameters which maximize the calculated likelihood according to a result of calculating the item parameters,
    wherein the item parameters include a probability that an answer is mistakenly incorrect even when a value of a latent response vector is 1 and a probability that a guessed answer is correct even when a value of the latent response vector is 0.

2. The apparatus of claim 1, wherein the conditional likelihood and probability calculator calculates the likelihood only using data about whether a specific learner's response to a specific item is correct.

3. The apparatus of claim 1, wherein the updater calculates and updates the item parameter only using data about whether a specific learner's response to a specific item is correct.

4. A system for providing personalized adaptive e-learning comprising:
    a learner's terminal configured to provide a learner with content related to adaptive e-learning;
    a tutor's terminal configured to display tutoring data for the adaptive e-learning; and
    a server comprising:
        a main interface configured to manage a status of learning or grades;
        an adaptive e-learning database (DB) configured to store data for providing adaptive e-learning; and
        a learner diagnosis engine configured to derive a learner's level of understanding of each attribute by taking into consideration learning result information of the learner and item information, in order for accurately estimating the learner's level of understanding when a large number of learners do not answer a same item,
    wherein the learner diagnosis engine is configured to model item answering results of learners using a cognitive diagnosis model and calculate the learner's proficiency to each attribute, wherein the learner diagnosis engine initializes a probability that an answer is mistakenly incorrect even when a value of a latent response vector is 1, and a probability that a guessed answer is correct even when a value of the latent response vector is 0, wherein the learner diagnosis engine is configured to calculate conditional likelihood according to:

$L(X_i|\alpha_l) = \Pi_{j \in J_i} P_j(\alpha_l)^{X_{ij}} (1-P_j(\alpha_l))^{1-X_{ij}}$ wherein Xij indicates a correct or incorrect answer, wherein the conditional likelihood is calculated except for a portion in which no response is present in Xij.

5. The system of claim 4, wherein the learner's terminal provides at least one of test progress, confirmation of understanding of each attribute, and supplementary learning for a weak attribute.

6. The system of claim 4, wherein the instructor's terminal displays at least one of test history, grades, and hourly statistics.

7. The system of claim 4, wherein the adaptive e-learning DB includes an educational content DB, an item DB, and an attribute DB which are correlated in a mutual N-to-N relationship.

8. The system of claim 7, wherein the adaptive e-learning DB includes a learner DB and a test DB which are correlated with the mutually correlated educational content DB, item DB and attribute DB.

9. The system of claim 4, wherein the learner diagnosis engine initializes a value of the learner's proficiency to each attribute, calculates a posterior probability by calculating a likelihood for a combination of the learner's levels of understanding with respect to a response matrix which is received as an item answering result of a learner, and estimates and updates the item parameter which maximizes the likelihood according to a result of calculating the posterior probability.

10. The system of claim 9, wherein the learner diagnosis engine calculates the likelihood and estimates the item parameter by taking into consideration only a case in which data on whether a specific learner's response to a specific item is correct is present.

* * * * *